United States Patent [19]

Malson et al.

[11] Patent Number: 4,714,550

[45] Date of Patent: Dec. 22, 1987

[54] CANTEEN CARRIED WATER PURIFIER SYSTEM

[75] Inventors: William S. Malson, Warren; John W. Sharpe, Ferndale, both of Mich.

[73] Assignee: Water Systems Development Corporation, Fraser, Mich.

[21] Appl. No.: 779,275

[22] Filed: Sep. 23, 1985

[51] Int. Cl.$^4$ .................. B01D 29/08; B01D 35/02
[52] U.S. Cl. .................................. 210/244; 210/282; 210/286; 210/416.3; 222/189; 222/400.8
[58] Field of Search ............... 210/282, 286, 244, 258, 210/416.3, 266; 206/547; 222/189, 400.8, 209, 190

[56] References Cited

U.S. PATENT DOCUMENTS

| 703,654 | 7/1902 | Hall | 222/189 |
|---|---|---|---|
| 789,968 | 5/1905 | Ernst | 210/286 |
| 929,337 | 7/1909 | Stebbins | 222/189 |
| 1,019,171 | 3/1912 | Melville-Hamilton | 210/459 |
| 2,566,371 | 9/1951 | Quinn | 210/416.3 |
| 3,335,917 | 8/1967 | Knight | 222/189 |
| 4,054,526 | 10/1977 | Muller | 210/416.3 |

FOREIGN PATENT DOCUMENTS

| 2726529 | 12/1978 | Fed. Rep. of Germany | 210/282 |
|---|---|---|---|
| 1023335 | 3/1966 | United Kingdom | 210/416.3 |

*Primary Examiner*—Richard V. Fisher
*Assistant Examiner*—Linda S. Evans
*Attorney, Agent, or Firm*—Basile and Hanlon

[57] ABSTRACT

A water purifying system includes an elongate chambered purifying assembly sized to be detachably mounted in a conventional canteen. The assembly is provided with an internal chamber filled with a particulate water purifying material and concentric tubes within the chamber require water flowing into the chamber through a filtered inlet at the bottom of the assembly to follow an extended chambered flow path through the purifying material to an outlet at the top of the assembly. The assembly includes a manually operable pump for pressurizing said container, thereby pumping water from the canteen through the purifying assembly.

2 Claims, 1 Drawing Figure

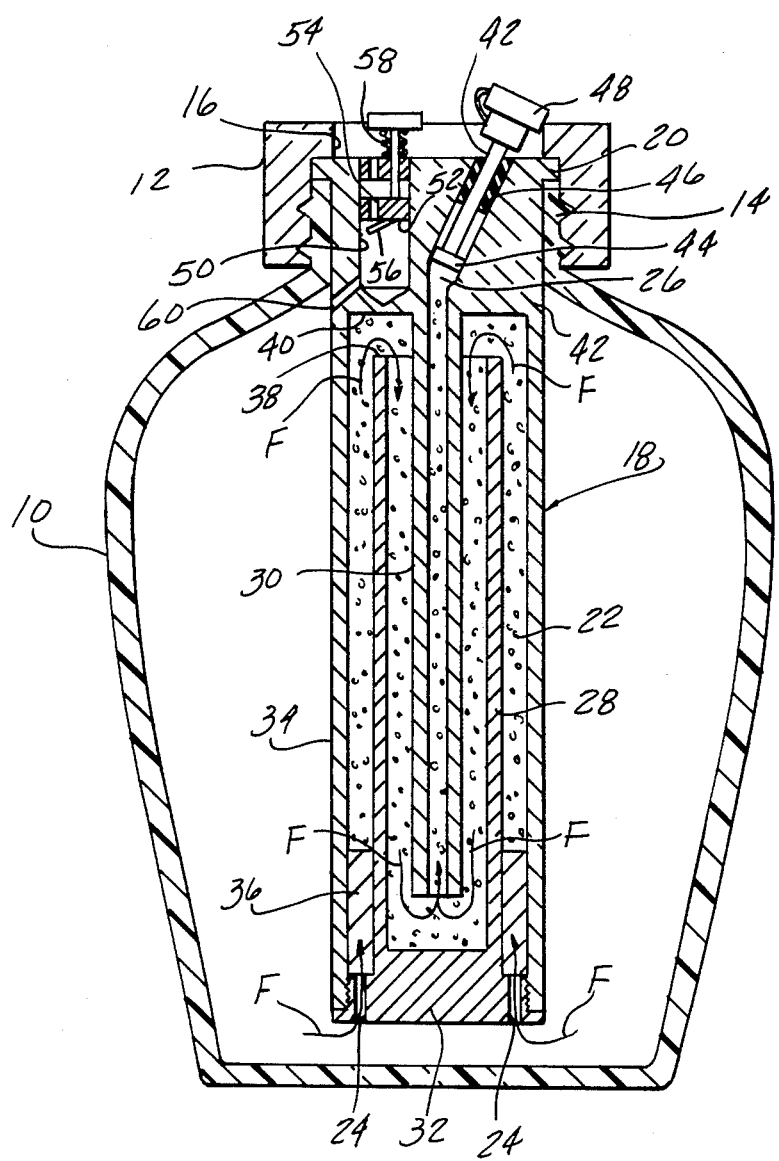

CANTEEN CARRIED WATER PURIFIER SYSTEM

BACKGROUND OF THE INVENTION

Purification of drinking water has been a long-standing problem confronting military personnel and outdoorsmen who spend extended periods of time in remote areas where only naturally occurring water sources are available. For practical purposes, water treatment systems require vehicular transport and thus individuals or small groups operating in areas remote from adequate roads are restricted to purification devices which can be conveniently carried by an individual on foot. Probably the most common device employed for such purpose is a purification tablet which is added to the water when a canteen is filled to dissolve within the water.

Apart from the generally unpleasant taste associated with water treated by the purification tablet method, their employment assumes the individual will carry an adequate supply of tablets, will carry them in a safe place where they will neither be lost nor crushed during strenuous activity, and will remember to use them each time the canteen is refilled. The tablets normally are sized to provide adequate purification for one canteen full of water, and to minimize the unpleasant taste associated with most tablets, the canteen is usually emptied and rinsed prior to each refilling, thereby effectively wasting a certain percentage of the supply of tablets.

The present invention is directed to a water purification system of a size such that it can be conveniently carried within a conventional canteen and to have and maintain effectiveness over numerous refillings of the canteen by employing treating agents which do not have to be supplemented at each refilling.

SUMMARY OF THE INVENTION

A purifying apparatus embodying the present invention takes the form of a purifying assembly of elongate cylindrical construction having a diameter such that the assembly may be longitudinally inserted into the interior of a canteen through the neck of the canteen. The assembly is provided with a radially outwardly projecting lip at its upper end which seats at the top of the neck and is sealingly clamped in this position by the canteen cap which is provided with a central opening providing access to a telescopic tube received in the top of the purifier assembly which functions in the fashion of a straw, and a manually operable pump plunger also located in the top of the assembly which is employed to pump air into the head space in the interior of the canteen to pump the water through the purifying assembly.

The length of the cylindrical assembly is such that when the lip referred to above is seated on the neck, the lower end of the assembly is located closely adjacent the bottom of the canteen. That portion of the assembly located within the canteen consists essentially of three concentrically mounted tubes of progressively decreasing diameter. The space between the various tubes is filled with pellets of a purifying material. Water flowing from the interior of the canteen to its outlet is directed by the tubes to flow along a flow path of an extended length through the bed of purifying particles.

Other objects and features of the invention will become apparent by reference to the following specification and to the drawing.

IN THE DRAWING

The FIGURE is a cross-sectional view of a purifying assembly embodying the present invention mounted in a canteen.

In the drawing, a canteen of conventional construction 10 is provided with a removable cap 12 threadably received on the neck 14 of the canteen in a conventional manner. The cap 12 is formed with a central opening 16.

A purifying assembly embodying the present invention includes an elongate cylindrical housing 18 formed with an outer diameter such that the assembly may be inserted into or withdrawn from the neck of the canteen. A radially outwardly projecting flange or lip 20 extends around the periphery of the housing 18 near its upper end and rests upon the upper end of neck 14. The length of housing 18 is such that when the lip 20 rests upon neck 14, the lower end of housing 18 is closely adjacent the bottom of the canteen body 10.

The major portion of the length of housing 18 is formed with an internal chamber 22 which is filled with particles or pellets of a water-purifying material, such as a deionizing resin. Suitable purifying materials are commercially available in various strengths and formulations which may be matched to anticipated contaminants. Among such commercially available materials are those manufactured and sold by Dow Chemical Company under the trademark DOWEX and those manufactured and sold by Rohm and Haas under the trademark AMBERLITE.

To increase the length of the flow path of water through housing 18 from inlets 24 at the bottom of the housing to an outlet passage 26 located near the top of the housing, concentric tubes 28 and 30 are mounted within the interior of chamber 22. While several mechanical arrangements for achieving the extended length flow path may be employed, in the embodiment shown in the drawing the tube 28 is formed integrally with an end cap 32 which is threadably received in the lower end of the outer casing 34 of housing 18. Two inlet openings 24 passing through end cap 32 place the interior of the canteen body 10 in communication with the annular space between wall 34 of housing 18 and the outer side of tube 28. An annular filter element 36 is located immediately above inlet openings 24 so that all water entering chamber 22 must pass first through inlet openings 24 and then through filter element 36. The upper end 38 of tube 28 terminates short of the top 40 of chamber 22.

The innermost tube 30 may be formed integrally with the upper section 42 of housing 18 to project centrally downwardly through the interior of tube 28 to a lower end spaced slightly above the closure cap 32. The interior of tube 30 communicates directly with an outlet passage 26 of the assembly, and flow of water from canteen 10 to outlet passage 26 must follow the restricted path indicated by the arrows F. The flow path F is restricted by the two inlet openings 24 and the outlet passage. This restricted flow path F results in a rapid flow rate through chamber 24, a critical feature to the utility of the device. Furthermore, by locating the inlet openings 24 at the lower end of housing 18, fluid will continue to enter the inlet openings 24 until the canteen 10 is virtually empty. The total length of this flow path is substantially three times the length of chamber 22 so that the untreated water with which canteen 10 is filled is given adequate exposure to the purifying media within chamber 22 before it reaches the outlet.

A hollow tubular member 42 is slidably received in outlet passage 26 and is formed with a radially projecting inner flange at its inner end at 44 which will engage the bottom of a sealing bushing 46 to prevent complete withdrawal of the tube 42 from passage 26. A closure cap 48 is detachably mounted on the enlarged upper end of the tube, the enlarged upper end of the tube preventing the tube from being pushed fully into passage 26.

The upper end of housing 18 is formed with a bore 50 which defines a piston chamber in which a piston 52 is manually reciprocable. A spring 58 resiliently biases the piston upwardly. Upon downward movement of piston 52, air in chamber 50 below the piston is expelled from the chamber through passage 60 located in the upper portion of the interior of canteen 10 into the head space thereof. Upon downward movement of the piston, a flapper valve 56 at the bottom of the piston closes to seal passage 54 through the piston, and the air beneath the piston is replenished upon the upward stroke of the piston via passage 54, flapper 56 opening during the upward stroke of the piston. By continually reciprocating piston 52, air pressure can be built up within the interior of canteen 10 without disturbing the contents thereof to pump water at a rapid flow rate from the canteen through the purifying assembly to outlet 26. Outlet tube 42 may be manually extended, and upon removal of cap 48 tube 42 can be used in the manner of a straw by the user.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

We claim:

1. In a canteen including a hollow, watertight container having a neck at its upper end, and cap means detachably mounted on said neck;
   the improvement comprising:
   an elongate, tubular purifier assembly inserted into said container through said neck and a lip projecting radially outwardly from said assembly at its upper end and resting upon the top of said neck and sealingly clampable against said neck by said cap means when said cap means is mounted on said neck, said assembly having means defining an internal chamber having a top and bottom and substantially filled with particles of a water purifying material; fluid inlet means at the lower end of said assembly for establishing fluid communication between said chamber and the interior of said container; means at the upper end of said assembly defining a fluid outlet means from said chamber; means defining a restricted flow passage in said chamber directing the flow of fluid through said chamber from said inlet means to said outlet means including a first tube located within said chamber extending upwardly from the bottom of said chamber and having an open upper end adjacent to and spaced below the top of said chamber, a second tube projecting downwardly from the top of said chamber into said first tube and having an open lower end located adjacent to and spaced above the bottom of said first tube, and passage means at the upper end of said second tube placing the interior of said second tube in fluid communication with said outlet means to define a fluid passage of a length substantially greater than the length of said chamber; manually operable pump means in said assembly for pumping fluid in said container through said chamber to said outlet, said pump means comprising means defining a pump chamber in said assembly adjacent the upper end of said assembly, said pump chamber having means defining an outlet opening into the upper portion of the interior of said container when said lip is seated on said neck, and piston means manually reciprocable in said pump chamber for pumping air from said pump chamber into the interior of said chamber; and filter means mounted in the flow passage of said assembly for filtering fluid flowing into said chamber via said inlet means.

2. The invention defined in claim 1 wherein said outlet means comprises means defining a passage opening at the upper end of said assembly, a hollow outlet tube slidably and sealingly received in said passage and having an outer end disposed externally of said assembly, said cap means having means defining an opening therethrough providing access to said outer end of said outlet tube, means establishing spaced end limits to sliding movement of said outlet tube in said passage, and closure means for closing the outer end of said outlet tube.

* * * * *